United States Patent [19]

Hirose et al.

[11] 3,767,532

[45] Oct. 23, 1973

[54] METHOD OF PRODUCING PROTEASE BY MICROORGANISM

[75] Inventors: Yoshiteru Hirose; Sadanobu Tobe; Masami Hoshino; Kohei Hashimoto; Koji Mitsugi, all of Kanagawa-ken, Japan

[73] Assignee: Ajinomoto Co., Inc., Tokyo, Japan

[22] Filed: Dec. 22, 1970

[21] Appl. No.: 100,818

[30] Foreign Application Priority Data
  Dec. 29, 1969  Japan.................................. 45/1555

[52] U.S. Cl................................. 195/65, 195/114
[51] Int. Cl............................................. C12d 13/10
[58] Field of Search..................... 195/66 R, 65, 114

[56] References Cited
  UNITED STATES PATENTS
  3,654,089   4/1972   Coker et al..................... 195/114 X 2,094,023   9/1937   Pollak............................. 195/114 X
  3,492,204   1/1970   Koaze et al...................... 195/66 R
  3,674,644   7/1972   Yokotsuka et al................ 195/65 X
  3,361,643   1/1968   Fukushima et al............... 195/66 R

OTHER PUBLICATIONS

Chemical Abstracts Vol. 62, 1965 12409g

*Primary Examiner*—Lionel M. Shapiro
*Attorney*—Kelman & Berman

[57]  ABSTRACT

Protease production by Bacillus subtilis and Rhodotolura glutinis by otherwise conventional culturing methods increased if the culture medium contains at least 0.02% of phytic acid or its salts.

7 Claims, No Drawings

METHOD OF PRODUCING PROTEASE BY MICROORGANISM

The present invention relates to a method of producing protease by microorganisms.

It is well known that proteases, such as acid protease, neutral protease or alkaline protease are produced in a culture medium by certain microorganisms, including yeasts, fungi and bacteria, and the proteases are used as pharmaceuticals, laundry detergents, food additives and tanning agents.

It has now been found that the production of the protease in the culture broth containing sources of assimilable carbon and nitrogen and minor nutrients can be greatly increased when a protease producing microorganism is cultured in the presence of phytic acid or its salts.

According to the present invention, 0.02 to 1.00 g/dl of phytic acid or a salt of phytic acid is added to the culture medium. Suitable of salts of phytic acid include alkali metal salts of phytic acid, such as potassium and sodium phytate, alkaline earth metal salts, such as magnesium and calcium phytate, Phytine(phytic acid calcium magnesium salt), and heavy metal salts. Water soluble phytic acid salts are preferably used, and when the salts are sparingly soluble in water, a suitable surface active agent may be present in the culture medium.

The present invention can be applied to protease production by culturing any microorganisms, such as bacteria, yeast, fungi and molds, and representative suitable microorganisms include *Bacillus subtilis, Pseudomonas aeruginosa, Streptomyces griseus, Candida tropicalis, Candida lipolytica* and *Rhodotorula glutinis*.

By the present invention, protease production may be increased twofold or more. Organic substances such as soybean cake, soybean powder, soybean extracts are conventionally used in large amounts as nitrogen sources and nutrients for the protease providing microorganism and make the medium viscous, because they are sparingly soluble in water. When phytine or another salt of phytic acid is used according to the present invention, the amount of organic nutrient in the culture medium may be decreased. Accordingly, the microbial cells can be easily removed from the culture broth and protease can be easily recovered from the broth.

EXAMPLE 1

A culture medium containing 5.0 g/dl soluble starch, 1.0 g/dl meat extract, 1.0 g/dl polypeptone, 0.25 g/dl NaCl, 0.5 g/dl "Pro-rich" (Brand Name of soybean protein) and 0.05 g/dl of a salt of phytic acid as indicated in Table 1, was prepared, and a 50 ml batch of each medium was placed in a 500 ml shaking flask, and heated to sterilize the medium. The medium was inoculated with a loopful of protease producing bacterium Bacillus subtilis AJ-3205 (NRRL B-3699), and cultured at 34° C for 48 hours with shaking. The amounts of protease produced in the culture broths are listed in the following Table 1.

TABLE 1

| Phytate added | Amount of protease produced (unit/ml) |
|---|---|
| Potassium phytate | 5,500 |
| Sodium phytate | 5,700 |
| Magnesium phytate | 5,700 |
| Calcium phytate | 5,900 |
| Magnesium calcium phytate | 5,900 |
| None | 2,800 |

Protease activity was determined by Anthon's method in which milk casein is hydrolyzed in a borate buffer of pH 9.5 at 37° C for 10 minutes, trichloroacetic acid soluble tyrosine is dyed with Folin's reagent, and the amount of released dye is determined. One unit is defined as the protease activity which releases 1 $\mu$g tyrosine per minute.

EXAMPLE 2

*Bacillus subtilis* NRRL B-3700 was cultured in the presence of varying amounts of calcium phytate as indicated in Tabe 2 in the same way as in Example 1. The results obtained are listed in the following Table 2.

TABLE 2

| Ca phytate added (g/dl) | Protease produced (units/ml) |
|---|---|
| 0 | 3,000 |
| 0.020 | 5,600 |
| 0.050 | 5,700 |
| 0.075 | 6,000 |
| 0.100 | 5,600 |
| 0.300 | 5,700 |
| 0.500 | 5,600 |
| 1.000 | 5,400 |

EXAMPLE 3

A culture medium containing 5.0 g/dl starch which had been treated with acid, 2.0 g/dl glucose, 1.5 g/dl milk casein, 0.25 g/dl $KH_2PO_4$, 0.02 g/dl $MgSO_4 \cdot 7H_2O$, 2.0 ml/dl "Aji-Eki" (Brand Name of soybean protein hydrolyzate) and 0.05 g/dl calcium phytate was inoculated with a loopful Bacillus subtilis AJ-3208 (NRRL B-3700), and cultured at pH 7.0, at 34° C for 48 hours with shaking. The culture broth was found to contain 6,700 units/ml protease.

Cultivation of Bacillus subtilis NRRL B-3700 was duplicated in the absence of calcium phytate in the same way, and the culture broth was found to contain 1,400 units/ml protease.

EXAMPLE 4

A culture medium containing 9.0 g/dl glucose, 1.0 g/dl milk casein, 0.5 g/dl $KH_2PO_4$, 0.04 g/dl $MgSO_4 \cdot 7H_2O$, 1.5 ml/dl "Aji-Eki", 10 $\gamma$/dl vitamin $B_1$ and 0.1 g/dl phytine was inoculated with Rhodotorula glutinis AJ-5193 (NRRL Y-7200), and cultured at pH 3.0 at 28°C for 72 hours with shaking. The culture broth was found to contain 640 units/ml acid protease. A culture broth which had been obtained in the absence of phytine was found to contain 550 units/ml acid protease.

What we claim is:

1. In a method of producing protease in which a protease-producing microorganism is cultured on a medium until said protease is produced, the improvement which comprises adding to said medium phytic acid or a salt of phytic acid in an amount of 0.02 to 1.00 gram per deciliter of said medium and sufficient to increase the amount of protease produced.

2. In a method as set forth in claim 1, said salt of phytic acid being a salt of said phytic acid with potassium, sodium, calcium, or magnesium.

3. In a method as set forth in claim 1, said microorganism being *Bacillus subtilis* or *Rhodotorula glutinis*.

4. In a method as set forth in claim 1, a salt of phytic acid being added to said medium, said salt being water soluble.

5. In a method as set forth in claim 1, said microorganism being *Pseudomonas aeruginosa, Streptomyces griseus, Candida tropicalis,* or *Candida lipolytica.*

6. In a method as set forth in claim 1, said medium containing sources of assimilable carbon and nitrogen and minor nutrients in an amount sufficient to permit the culturing of said microorganism and the production of significant amounts of said protease in the absence of said phytic acid or salt of phytic acid.

7. In a method as set forth in claim 6, said phytic acid or salt of phytic acid being added to said medium in substantially pure form.

* * * * *